United States Patent
O'Donoghue

(10) Patent No.: US 7,461,246 B2
(45) Date of Patent: Dec. 2, 2008

(54) FIRST-TIME STARTUP DEVICE WARRANTY USER INTERFACE NOTIFICATION

(75) Inventor: Niall O'Donoghue, Narva (FI)

(73) Assignee: Nokia Corporation, Espoo (FI)

( * ) Notice: Subject to any disclaimer, the term of this patent is extended or adjusted under 35 U.S.C. 154(b) by 420 days.

(21) Appl. No.: 11/120,019

(22) Filed: May 2, 2005

(65) Prior Publication Data

US 2006/0248500 A1    Nov. 2, 2006

(51) Int. Cl.
*G06F 15/177* (2006.01)
(52) U.S. Cl. .................. 713/2; 713/1; 713/100
(58) Field of Classification Search ........... 713/2
See application file for complete search history.

(56) References Cited

U.S. PATENT DOCUMENTS

| | | | |
|---|---|---|---|
| 5,894,596 A * | 4/1999 | Hayes, Jr. ................ 455/418 |
| 5,912,621 A * | 6/1999 | Schmidt .................. 340/571 |
| 6,163,693 A * | 12/2000 | Rydbeck .................. 455/418 |
| 6,191,503 B1 * | 2/2001 | Kitten et al. .............. 307/112 |
| 6,240,286 B1 * | 5/2001 | Rydbeck ................ 455/414.1 |
| 6,289,456 B1 * | 9/2001 | Kuo et al. .................. 726/34 |
| 6,343,360 B1 * | 1/2002 | Feinleib ..................... 713/1 |
| 6,711,033 B2 | 3/2004 | Weiblen et al. |
| 6,721,885 B1 * | 4/2004 | Freeman et al. ............ 713/2 |
| 6,745,343 B1 * | 6/2004 | Barenys et al. ............ 714/36 |
| 6,988,203 B2 * | 1/2006 | Davis et al. ............. 713/185 |
| 7,124,170 B1 * | 10/2006 | Sibert .................... 709/216 |
| 7,272,076 B2 * | 9/2007 | Burkes et al. .............. 368/29 |
| 2002/0026395 A1 * | 2/2002 | Peterson ................... 705/35 |
| 2004/0250087 A1 * | 12/2004 | Ray et al. ................ 713/189 |

* cited by examiner

*Primary Examiner*—Nitin C Patel
(74) *Attorney, Agent, or Firm*—Foley & Lardner LLP

(57) ABSTRACT

A first time startup mechanism for use with an electronic device to determine whether the device has been previously started. The first time startup mechanism determines whether device has been previously started. If the device has then been previously started, the device operates as normal. If the device has not been previously started, then the user is provided with notification as such.

20 Claims, 2 Drawing Sheets

FIRST-TIME STARTUP DEVICE WARRANTY USER INTERFACE NOTIFICATION

FIELD OF THE INVENTION

The present invention relates generally to use detection in electronic devices. More particularly, the present invention relates to the detection and indication of startup functions on electronic devices.

BACKGROUND OF THE INVENTION

As electronic devices have become more prevalent, worries about their safety and security have also increased. Both manufacturers and consumers are forced to rely on the integrity of various, and often nebulous, distribution chains. Electronic devices are susceptible to various physical alterations by third parties. These alternations can go undetected by a consumer. Small apparatus are well known which can be integrated into an electronic device prior to receipt by a consumer. In addition, many electronic devices now contain software resident in memory on the device itself. Third parties can modify the software or place additional software in the memory for various reasons. A user has no way to guarantee that their new device has not been used since leaving the manufacturer.

These security flaws in current devices have resulted in the consumers having no way to determine if the "new" device they are purchasing is actually new and unadulterated or has not been modified since leaving the factory. This issue raises at least two concerns. First, consumers want to be sure that they are getting what they pay for, i.e. a new device. The second concern is that, between the manufacturer and the consumer, some third party will alter the device in a nefarious manner, such as for the collecting and transmitting of personal data.

Driving the first concern is the fact that consumers do not want to receive a refurbished or used product which is packaged as a new product. A related concern is that manufacturers want to ensure that consumers are purchasing new legitimate goods, not counterfeit or copycat goods.

The second concern has become particularly important, as electronic devices have become a repository for personal information. A device may be transferred between numerous parties from the moment it leaves the manufacturer to the ultimate receipt by a consumer. This provides opportunities for a third party to alter the electronic device as discussed above. In such a situation, the device may boot up normally as if booting up for the first time, even though it has been tampered with before purchase by the user. Spyware can be inserted into the device and silently monitors the user's keypresses. The user could then start an application which uses credit cards or banking information, and the spyware can capture the user's PIN or passcode and reads/records the data content of the application. At some point during a subsequent network connection, the spyware can transmit the captured personal or private information back to a base where it can be retrieved. The user would be unaware of the spyware transmission, since it happens during normal network activity anyways. In this situation, the normal network activity icon does not help the user identify the spyware transmission.

Thus, a need exists for an electronic device which is capable of detecting use following manufacture. The startup detection mechanism itself needs to be resistant to tampering to insure the integrity of the system. The startup mechanism needs to be secure enough to address the use of software by a third party to modify the electronic device.

SUMMARY OF THE INVENTION

The present invention provides a first time startup mechanism for notifying a user when an electronic device is started for the first time. An electronic device of the present invention is able to determine if it has been previously started. In one embodiment of the invention, a display notification is provided to alert the user to the status as a first startup.

The present invention provides a user with an assurance that their electronic device has not been tampered with during transit from the manufacturer. This allows a user to be confident in the security of the device and enables the user to freely use the device without concern of "spyware" or other such foreign items being resident in the device when the user receives it. The startup device may also provide the benefit of presenting useful information to a user upon the first startup of the device and aiding the user in becoming acquainted with their new device.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
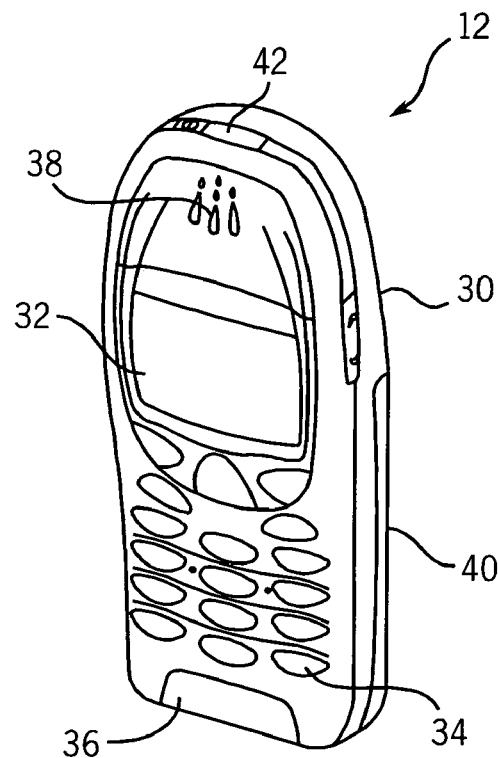
FIG. 1 is a perspective view of a mobile telephone that can be used in the implementation of the present invention.
Figure 2:
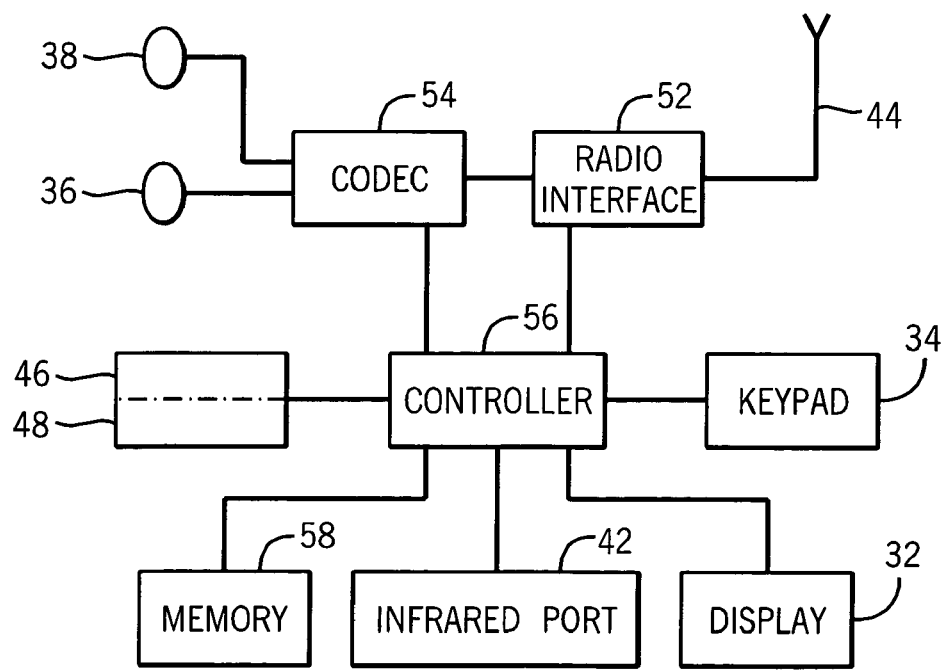
FIG. 2 is a schematic representation of the telephone circuitry of the mobile telephones of FIGS. 1 and 3.
Figure 3:
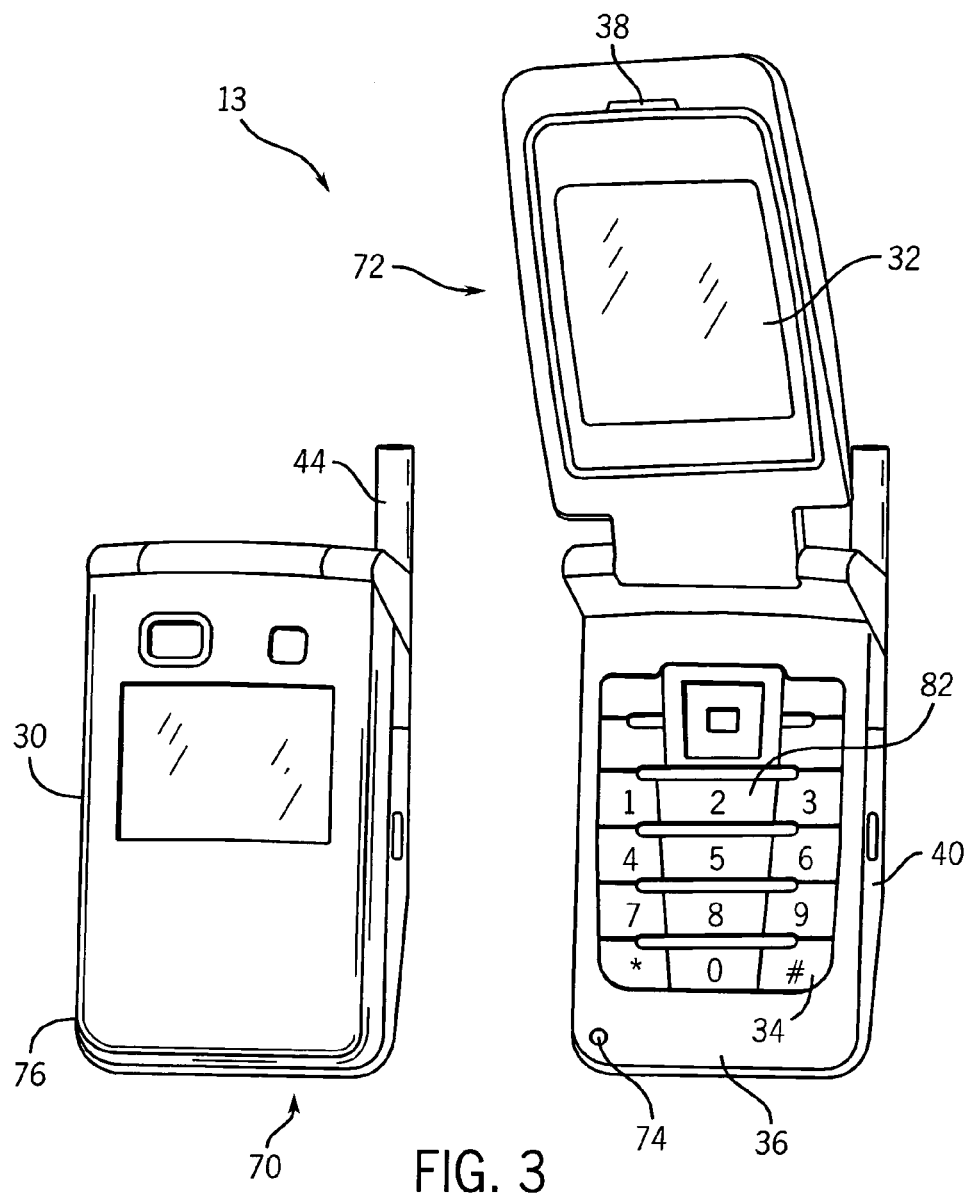
FIG. 3 is a perspective view of another type of telephone that can be used win the implementation of the present invention.

The present invention provides an electronic device adapted to indicate to a user whether the device is being started for the first time. In one exemplary embodiment, the electronic device of the present invention comprises a mobile phone. FIGS. 1 and 3 show representative mobile phones within which the present invention may be implemented. FIG. 1 illustrates a "candy bar" style mobile phone 12. FIG. 2 illustrates a "clam shell" style mobile phone 13, which includes a closed state 70 and an open state 72. It should be understood, however, that the present invention is not intended to be limited to one particular type of mobile telephone 12 or other electronic device. FIG. 2 illustrates a schematic representation of the mobile phone of FIGS. 1 and 3.

The mobile telephones of FIGS. 1-3 includes a housing 30, a display 32 in the form of a liquid crystal display, a keypad 34, a microphone 36, a speaker 38, a battery 40, an infrared port 42, an antenna 44, a smart card 46 in the form of a universal integrated circuit card (UICC) according to one embodiment of the invention, a card reader 48, radio interface circuitry 52, codec circuitry 54, a controller 56 and a memory 58. Individual circuits and elements are all of a type well known in the art, for example in the Nokia range of mobile telephones. Other types of electronic devices within which the present invention may be incorporated can include, but are not limited to personal digital assistants (PDAs), integrated messaging devices (IMDs), desktop computers, notebook computers, and other portable communication devices.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc.

The present invention includes a mechanism for determining whether a particular startup of the device is the first time the device has started since a prior event. In an exemplary embodiment of the invention, the device is adapted to recognize the first startup since manufacturing of the device was completed. The mechanism may be implemented via either a physical mechanism or by computer code. In one embodiment of the invention, digital certificates, implanted by the manufacturer into secure storage, are used and are disabled or destroyed following an initial startup. In another embodiment, lifetime product digital certificates could be implanted as the trusted root certificate for specific device.

Figure 4:
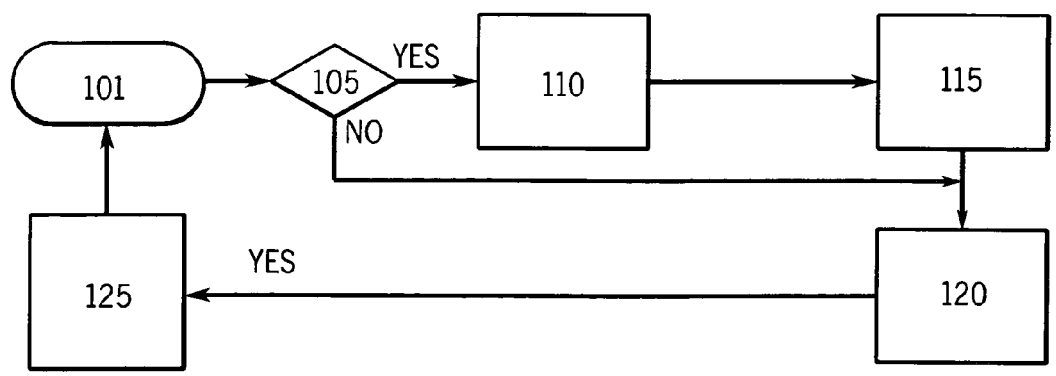
FIG. 4 is a flow chart showing an implementation of one embodiment of the present invention.

As shown in FIG. 4, the electronic device is turned on at step 101. As a default, the electronic device is set to "first startup". At step 105, the electronic device determines whether this is the first time the device has been started. If it is not the first time, then the device continues to step 120, which is the normal operation of the device (until it is turned off at step 125). If it is determined at step 105 that it is a first startup for the device, then the device is set to "not first startup" at step 110. In one embodiment of the invention, certain information is displayed at step 115 prior to the device entering normal operation at step 120. The device may be turned off at step 125. Subsequent times the device is turned on, the device will recognize at step 105 that it is set to "not first startup" and will proceed directly to step 120.

A manufacturer may have the need to allow a trusted third party, such as a reseller, to have access to the electronic device after manufacturing. In one embodiment of the invention, the startup device may be reset. A manufacturer may wish to allow certain resellers or intermediaries to install their own software or alter the electronic device and, in one embodiment of the invention, the manufacturer may provide information regarding the location of the startup device in the electronic device's memory. In one exemplary embodiment, the startup device is not active until the third party has completed the modification of the device. For example, in one embodiment of the invention, the third party itself installs software coding for the startup device.

As shown in FIG. 3, a physical tamper indicator may be used. In one embodiment of the invention, the tamper indicator comprises an electric sensor 74. In another embodiment of the invention, the tamper indicator comprises a visual indicator 76. As disclosed earlier, in an exemplary embodiment of the invention, the telephone is a clamshell-type phone 13 as shown in FIG. 3. The clamshell phone 13 has positioned in the "interior" 82 of the clamshell a sensor 120 for detecting when the phone 13 has been opened. In one embodiment of the invention, the sensor comprises a photoreactive chemical. In yet another embodiment of the invention, an electromagnetic sensor is used. In still another embodiment of the invention, the sensor 120 is in operative communication with the controller 56 to electrically signal that the phone has been opened. In embodiments where the tamper indicator is a visual indicator, various physical mechanisms for determining tampering may be used including but not limited to holographic adhesive markers. In another exemplary embodiment, the electronic device is a PDA or "candy bar" style mobile phone. The tamper indicator may be provided as a secure holographic bag in which the electronic device is packaged. In another embodiment, a throwaway cover in communication with a sensor may be provided, where the removal of the cover triggers the sensor to indicate that the telephone has been tampered with.

As shown in FIG. 4, in one embodiment of the invention, a display step 115 is utilized in the present invention. In an exemplary embodiment of the invention, startup information is displayed on the display 32 when it is determined at step 105 that a first startup is occurring. The startup information may include, in one embodiment of the invention, a visual notification that the device is being started for a first time. In another embodiment, an audio indication is provided the first time the electronic device is started. Additional information which may be displayed in exemplary embodiments includes, but is not limited to: device serial number, device system information, device manufacture information, warranty information, instructions regarding operation of the device, legal information, contest information, access codes, or various other information. In an exemplary embodiment of the invention, an access code may be provided which allows a user to view the startup information during subsequent operation of the device.

The present invention is described in the general context of method steps, which may be implemented in one embodiment of the invention by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

Software and web implementations of the present invention could be accomplished with standard programming techniques, with rule based logic, and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for securing the first startup of a device comprising:
   initializing startup of the device;
   determining if a previous startup has occurred since a predetermined event;
   if no previous startup has occurred since the predetermined event, noting that a startup has occurred and exhibiting an information indication to a user of the device that no prior startup has occurred since the predetermined event; and continuing to normal operation of the device;

wherein the device will recognize on a subsequent startup that the device has undergone a previous startup since the predetermined event, and wherein the device will not exhibit the information indication during the subsequent startup and any later startup.

2. The method of claim 1, wherein the electronic device comprises a mobile telephone.

3. The method of claim 1, wherein the predetermined event comprises leaving a manufacturer.

4. The method of claim 1, wherein the predetermined event comprises leaving a vendor.

5. The method of claim 1, further comprising determining a state of a tamper indicator.

6. The method of claim 1, wherein the information indication further comprises information chosen from the group consisting of a serial number, manufacture information, warranty information, instructions regarding operation of the device, legal information, contest information, access codes, and combinations thereof.

7. The method of claim 1, wherein the determining of whether a previous startup has occurred comprises the use of hardware.

8. The method of claim 1, wherein the determining of whether a previous startup has occurred comprises the use of software.

9. A computer program product, embodied on a memory, comprising:

computer code for initializing startup of a device;

computer code for determining if a previous startup has occurred since the predetermined event;

computer code for, if no previous startup has occurred since the predetermined event, noting a startup has occurred and exhibiting to a user of the device an information indication that no prior startup has occurred since the predetermined event; and computer code for continuing to normal operation of the device;

wherein the device comprises computer code that will recognize on a subsequent startup that the device has undergone a previous startup since the predetermined event and to not exhibit the information indication during the subsequent startup and any later startup.

10. The computer program product of claim 9, wherein the electronic device comprises a mobile telephone.

11. The computer program product of claim 9, wherein the predetermined event comprises leaving a manufacturer.

12. The computer program product of claim 9, wherein the predetermined event comprises since leaving a vendor.

13. The computer program product of claim 9, wherein computer code for providing information comprises providing information chosen from the group consisting of a serial number, manufacture information, warranty information, instructions regarding operation of the device, legal information, contest information, access codes, and combinations thereof.

14. The computer program product of claim 9, wherein the computer code for determining if a previous startup has occurred comprises computer code for a digital certificate.

15. An electronic device, comprising:

a processor for processing information; and a memory unit operatively connected to the processor, the memory unit including:

computer code for initializing startup of the electronic device;

computer code for determining if a previous startup has occurred since a predetermined event;

computer code for, if no previous startup has occurred since the predetermined event, noting a startup has occurred and exhibiting to a user of the electronic device an information indication that no prior startup has occurred since the predetermined event; and computer code for continuing to normal operation of the electronic device;

wherein the electronic device comprises computer code that will recognize on a subsequent startup that the electronic device has undergone a previous startup since the predetermined event, and wherein the device will not exhibit the information indication during the subsequent startup and any later startup.

16. The electronic device of claim 15, wherein the electronic device comprises a mobile telephone.

17. The electronic device of claim 15, wherein the predetermined event comprises leaving a manufacturer.

18. The electronic device of claim 15, wherein the predetermined event comprises since leaving a vendor.

19. The electronic device of claim 15, wherein the information indication comprises information chosen from the group consisting of a serial number, manufacture information, warranty information, instructions regarding operation of the device, legal information, contest information, access codes, and combinations thereof.

20. The electronic device of claim 15 further comprising a tamper indicator.

\* \* \* \* \*